US 6,666,651 B2

(12) United States Patent
Rust

(10) Patent No.: US 6,666,651 B2
(45) Date of Patent: Dec. 23, 2003

(54) COMPOSITE PROPELLER BLADE WITH UNITARY METAL FERRULE AND METHOD OF MANUFACTURE

(76) Inventor: Jim Rust, 10334 Leila La., Santee, CA (US) 92071

( * ) Notice: Subject to any disclaimer, the term of this patent is extended or adjusted under 35 U.S.C. 154(b) by 0 days.

(21) Appl. No.: 10/082,047

(22) Filed: Feb. 20, 2002

(65) Prior Publication Data
US 2003/0156944 A1 Aug. 21, 2003

(51) Int. Cl.$^7$ ................................................. B64C 11/26
(52) U.S. Cl. ...................... 416/204; 416/230; 416/239; 416/248
(58) Field of Search .................... 416/204 R, 214 R, 416/219 R, 230, 239, 248

(56) References Cited

U.S. PATENT DOCUMENTS

| | | | | |
|---|---|---|---|---|
| 2,290,607 A | * | 7/1942 | Sensaud De Lavaud | 416/134 R |
| 2,631,680 A | * | 3/1953 | Le Compte et al. | 403/225 |
| 2,954,828 A | * | 10/1960 | Marchetti | 416/226 |
| 3,734,642 A | * | 5/1973 | Dixon | 416/61 |
| 3,784,322 A | * | 1/1974 | Erich et al. | 416/229 R |
| 4,302,155 A | | 11/1981 | Grimes et al. | 416/144 |
| 4,810,167 A | | 3/1989 | Spoltman et al. | 416/229 |
| 4,834,616 A | * | 5/1989 | Kasarsky et al. | 416/229 R |

* cited by examiner

Primary Examiner—Ninh H. Nguyen
(74) Attorney, Agent, or Firm—Mary Jo Redman; Calif Tervo

(57) ABSTRACT

Composite blade assembly 10 for a propeller assembly for an airplane, including unitary metal ferrule 50 attached to a fiber-reinforced composite blade 20; and a method for manufacturing blade assembly 10. Internal pressure molding includes unitary ferrule 50 as part of mold 81 and bladder 90 pressurizes composite material 31 from within. Blade 20 is retained within inner bore 53 of unitary ferrule 50 by adhesion of the epoxy matrix and by grooves 55. The method of manufacture creates a cured blade assembly 10 that requires little or no post-machining.

15 Claims, 2 Drawing Sheets

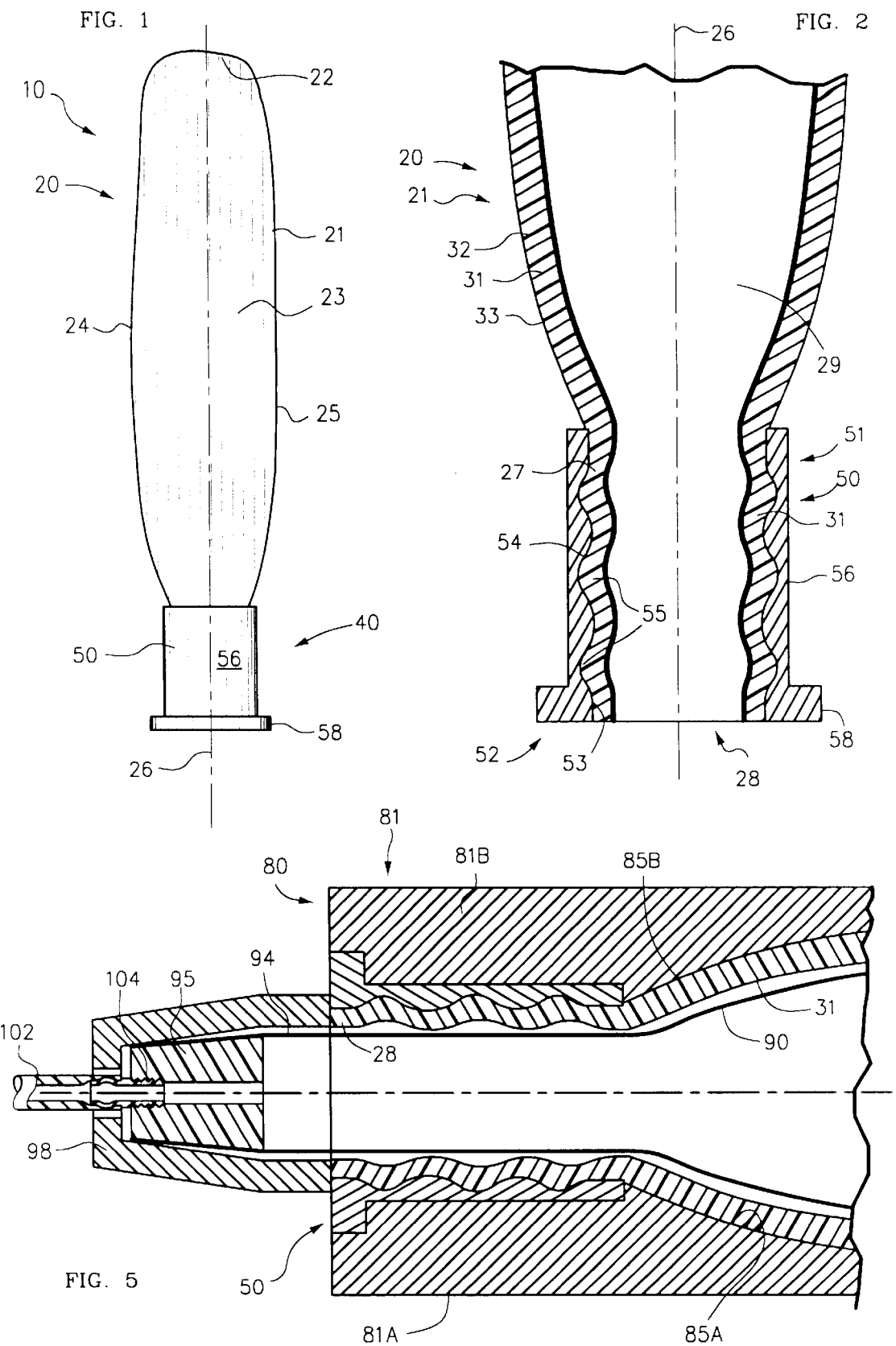

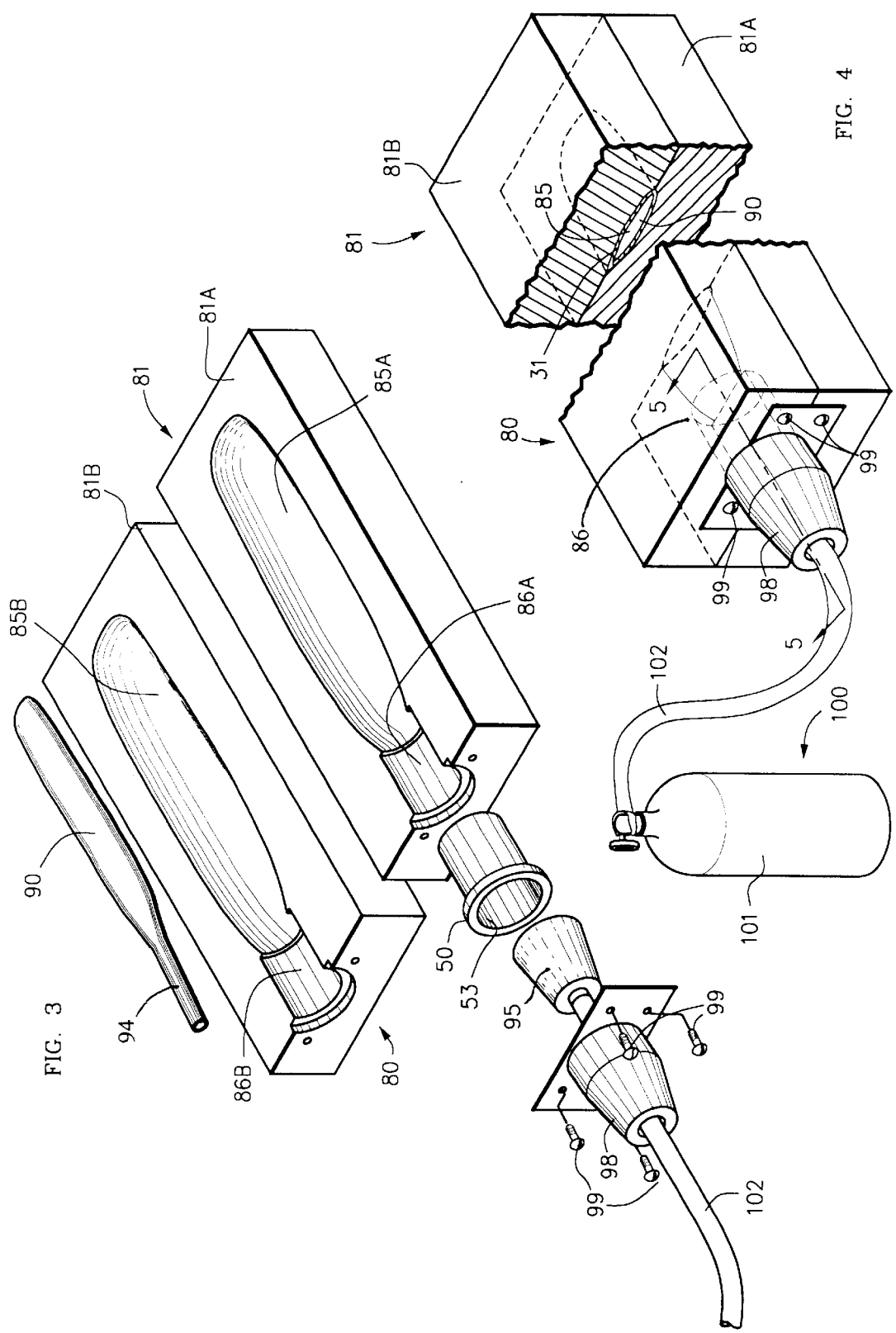

COMPOSITE PROPELLER BLADE WITH UNITARY METAL FERRULE AND METHOD OF MANUFACTURE

FIELD OF THE INVENTION

This invention relates generally to propeller blades for airplanes, and more particularly to a fiber-reinforced resin composite blade attached to a unitary metal ferrule and a method of manufacture.

BACKGROUND OF THE INVENTION

Modern propellers for small airplanes and airboats typically consist of an assembly of two, three, or more blades attached symmetrically around a rotatable hub. The blade is often machined from aluminum, or may be fabricated from fiber-reinforced resin, such as graphite fibers embedded in an epoxy matrix.

Aluminum blades are generally strong. A disadvantage is that the edges of an aluminum blade usually get heavily nicked and pitted by gravel and other objects, requiring remachining of the edges. Another disadvantage is that metal blades are heavy, compared to synthetic composite blades. All materials for airplanes are preferably light, but it is especially desirable for the propeller to be light, so that the center of gravity of the airplane is not near the nose of the airplane. Another disadvantage is the cost of the material and the cost of machining the blade.

Resin/fiber composite blades are lighter than aluminum blades. An advantage of composite materials is that the fibers can be selected and oriented to yield a blade with more stiffness where needed and more ductility where needed. For example, glass fiber is more ductile than graphite; graphite fiber is stiffer than glass and has greater tensile strength. So that articles of consistent quality and strength can be fabricated from resin/fiber composites, fabricators often use "pre-preg," that is, a fibrous material pre-impregnated with resin. Typically, the fibrous material is saturated with liquid resin and heated very gently to cause the resin to gel to what is called the "B-stage," but not to cure.

B-stage resin contains very little solvent and the molecules of polymer are close together but not cross-linked. The resin cannot flow at room temperature, but generally does soften when heated. B-stage pre-preg material up to several thousandths of an inch in thickness can be cut with scissors and feels like stiff paper or manila stock.

Other methods are also used, such as "wet lay-up," wherein the fibrous material is saturated with liquid resin by the fabricator and laid up into the mold, without and intermediate B-stage.

The orientation of the fibers within the resin matrix has a large affect on the stiffness of the resulting resin/fiber composite. Fibers may be woven or knit before impregnation, or may be aligned parallel to each other. When the fibers are aligned parallel, the resulting pre-preg is called "unidirectional." Unidirectional resin/fiber composite is flexible if bent parallel to the fibers and stiff if bent across the fibers. Woven and knit textiles also have characteristic flexing properties.

A relatively well-known method of fabricating propeller blades, called "compression molding," starts with machining a mold having two halves, each having a cavity the shape of one side of the blade. Uncured fiber/resin composite material is arranged in the cavities according to a design plan called a "lay-up schedule." The lay-up schedule specifies the shape and fiber orientation of the pieces, which are overlapped to yield the desired tapering shape. Splitting the mold into two halves is generally preferred for molding an article having bilateral symmetry; an article with a higher degree of symmetry might preferably be molded from a mold divided into a higher number of segments.

Typically, uncured resin/fiber composite is laid up in each mold half and an insert of wood or polyurethane foam is placed in one of the halves. Strengthening inserts, typically machined from titanium or aluminum, are also generally included. The halves of the mold are brought together and clamped. This "mold assembly," consisting of metal mold halves and inserts, is heated to the curing temperature, such as by being placed in an oven.

During curing, the resin flows to join the uncured resin/fiber composite into a fairly uniform mass, which adheres to the insert. The resin eventually crosslinks and becomes rigid. After the resin is cured, it will not soften again upon heating.

One disadvantage of using compression molding to make propeller blades is the high cost. Both materials and labor for compression molded propeller blades are expensive. For example, U.S. Pat. No. 4,810,167 of Spoltman et al. discloses a propeller blade that contains multiple machined components. Some of the components are laid up in the mold assembly; others are glued on after molding. The base of the molded blade must be precision machined to accept these glued-on components.

This method also has a large indirect cost, which is inflexibility of mold use. Because there are critical mating surfaces on the foam and metal inserts, the post-assembled components (components attached to the molded article after cure), as well as the mold cavities, each mold is dedicated to making a single design of blade. Even the ability to change the lay-up schedule to make a blade of the same shape, but different stiffness characteristics, is seriously limited. Because molds are typically the most expensive and longest lead-time part of new design, it is undesirable to have to make a new mold to accommodate every small change.

To avoid these high costs of machined parts, complicated lay-up, and single-design molds, the method known as "internal pressure molding," or "IPM," has been used to make propeller blades. IPM uses a mold cavity to define the outer shape of the article being molded, as does compression molding, but an inflatable, stretchable bladder compresses the resin/fiber composite from the inside. Blades made using IPM are hollow; no foam or wood insert is needed. Eliminating the insert decreases machining cost, assembly cost, and weight of the finished article. The bladder conforms to the profile of the composite material, thus one mold can accommodate nearly any lay-up schedule that yields the same external shape. New lay-up schedules can be tested very cheaply and fewer molds are needed in the shop.

A major disadvantage of conventional IPM composite blades is that they are not as strong as solid aluminum or compression molded blades having metal inserts and glued-on reinforcing components. The root of the blade, especially the portion that attaches to the hub, must withstand high dynamic force and fatigue. The root of the blade can be reinforced by attaching two halves of a split collar around it after it is molded. This strengthens the blade, but neutralizes some of the cost savings of IPM. A split collar is also not as strong as a unitary collar or ferrule is. As a result, the market for IPM airplane blades has been limited to relatively low-performance craft. There is a need for a simple, inexpensive IPM airplane propeller blade that is strong enough to be used on the most demanding airplanes, such as competitive aerobatic planes.

SUMMARY OF THE INVENTION

This invention is an IPM composite blade assembly that is suitable for competitive aerobatic airplanes, or for other uses, such as airboats. The blade assembly includes a fiber-reinforced resin blade, means for mounting the assembly onto a propeller hub, and a unitary ferrule for reinforcing the root of the blade.

The unitary ferrule is co-molded with the blade and preferably forms a part of the mold. Assembly of the ferrule into the lay-up is very simple and quick. Because the unitary ferrule does not have to be split to go over the molded root of the blade, it is very strong.

The uncured composite material is laid up into a standard segmented mold. An inflatable bladder is laid between the halves of the mold before the mold is closed. Each cavity segment includes a recess segment that accommodates half of the ferrule and the end of the recess segment is open at the end. The uncured composite material laid into the ferrule recess forms the root of the blade.

The mold segments are mated together with the cavity segments facing each other. The laid-up uncured composite material and the bladder are within the mold cavity, which consists of the two cavity segments. After the segments of the mold are mated, i.e., the mold is "closed", the unitary ferrule is slipped into the open end of the mold, into the recess comprising the recess segments.

The combination of closed mold, bladder, and ferrule are herein called the "mold assembly." When the mold assembly is heated, the resin matrix of the composite material flows, as described above. The resin wets the inner bore of the unitary ferrule and forms a strong adhesive bond to it. This bond is stronger than the one formed by gluing metal components onto the cured composite, because the bond extends deep within the matrix of the root portion.

The unitary ferrule preferably includes mechanical means for strengthening the bond, such as deep grooves and ridges on the inner bore. The main force on the blade during flight is parallel to the longitudinal axis of the blade (centripetal force from rotation of the propeller assembly). The grooves and ridges cause much of the root portion of the blade to be under compression, strengthening the adhesive bond between the root portion and the inner bore, as well as locking the blade mechanically to the ferrule.

The blade assembly includes mounting means for mounting the blade assembly onto a standard type of propeller hub. The mounting means includes the ferrule. For example, the ferrule may include a circular flange around its perimeter that mates with attachment means in the hub. The mounting means typically includes critically-dimensioned surfaces. Because the outer surface of the ferrule is already precision machined to fit the cavity of the mold, using the outer surface of the ferrule as a mounting means does not add cost to the ferrule or to the blade assembly. The inner bore does not generally require precision machining. The low number of machined components and lower number of critical surfaces helps prevent machine tools from "bottlenecking" the manufacturing process.

Assembly of this reinforced blade is scarcely any more difficult than assembly of an un-reinforced IPM blade. Due to the conformability of the bladder, a single mold is used for all blade assemblies that have the same outside shape. Blade assemblies having different lay-up schedules and different conformation of the inner bore of the ferrule are molded on the same molds. This increases productivity by allowing a mold to be used for several different products, minimizing the mold's idle time. Molds can be made even more flexible by using removable inserts to provide the recesses for different ferrules. Such an insert would be handled only once during set-up for a given product run and again during break-down; hence would not increase the handling required for each blade assembly.

The blade assembly and method of the present invention allows propeller assemblies to be made that have strength and performance comparable to propellers made by compression molding or by machining of metal, but with less weight and a fraction of the cost. Propeller blades assemblies made according to the present invention are comparable in cost to non-reinforced blades made by IPM and blades reinforced with split collars, but are stronger and longer-lasting.

The invention will now be described in more particular detail with respect to the accompanying drawings in which like reference numerals refer to like parts throughout.

BRIEF DESCRIPTION OF THE DRAWINGS

FIG. 1 is a side view of the propeller blade assembly of the present invention.

FIG. 2 is an enlarged, partially cut away, cross-sectioned view of the lower portion of the propeller blade assembly of FIG. 1.

FIG. 3 is an exploded perspective view of components of the mold assembly used to manufacture the propeller blade assembly of FIG. 1.

FIG. 4 is a reduced perspective view, partly cut away, of the mold assembly of FIG. 3 assembled and closed in molding configuration.

FIG. 5 is an enlarged cross-section view of the mold assembly of FIG. 4, taken along line 5—5.

DETAILED DESCRIPTION OF THE INVENTION

FIG. 1 is a side view of the propeller blade assembly 10 of the present invention and FIG. 2 is an enlarged, partially cut away, cross-sectioned view of the lower portion of propeller blade assembly 10 of FIG. 1. Propeller blade assembly 10 generally includes composite blade 20 and mounting means 40, including a unitary ferrule 50.

Composite blade 20 includes an airfoil portion 21 for moving air and root portion 27 attached to ferrule 50. Airfoil portion 21 is generally elongate, with a longitudinal axis 26 between root portion 27 and the tip 22, which is opposite root portion 27. Airfoil portion 21 includes two generally flat sides 23 that join along leading edge 24, trailing edge 25, and at tip 22.

Mounting means 40 attaches root portion 27 to a propeller hub. Ferrule 50 encircles root portion 27 and reinforces it. In the preferred embodiment shown in FIG. 1, mounting means 40 includes a flange 58 that is part of unitary ferrule 50 and projects from outer surface 56 of unitary ferrule 50. Flange 58 is adapted to mate with standard attachment means (not shown) of a propeller hub.

Referring now to FIG. 2, it is seen that composite blade 20 is a shell, open at root end 28. Cavity 29, inside the shell, is typically air-filled. The material of the shell of blade 20 is preferably a fiber-reinforced resin 31, such as unidirectional carbon fiber in an epoxy matrix 32 or woven fiberglass in an epoxy matrix 33. Various fiber-reinforced resins 31 can be combined in a single composite blade 20, such as by laying up unidirectional carbon/epoxy, with the fibers generally parallel to longitudinal axis 26, to form the main body of composite blade 20, using woven fiberglass/epoxy 33 as a ductile skin over the surface of composite blade 20.

Unitary ferrule 50 includes an inner bore 53, which contacts and reinforces root portion 27. Root portion 27 is attached to inner bore 53 during the curing operation by adhesion between the surface of inner bore 53 and fiber-reinforced epoxy resin 53. Epoxy resin forms a strong bond to aluminum metal, a preferred material for ferrule 50. Inner bore 53 preferably includes retaining means 54, such as grooves 55, for strengthening the attachment of root portion 27 to inner bore 53. Grooves 55 circle the perimeter of inner bore 53 generally perpendicular to longitudinal axis 26.

When propeller assembly 10 is rapidly rotated by a propeller hub, propeller assembly 10 experiences stresses. There is lateral force on propeller assembly 10, but the largest force is parallel to longitudinal axis 26 and acts to pull blade assembly 10 away from the hub and to pull blade 20 out from ferrule 50. Grooves 55 oppose this outward force in two ways. First, grooves 55 increase the surface area of adhesive contact between root portion 27 and inner bore 53. Secondly, grooves 55 redirect the force and cause alternating areas of root portion 27 to be under compression or tension. Other retaining means 54 (not illustrated) include roughening of the surface of inner bore 53, laying up root portion 27 such that the ends of fiber-reinforced resin 31 lap over hub face 52 of unitary ferrule 50, or inserting pins through unitary ferrule 50 into root portion 27.

Mounting means 40 is adapted to cooperate with the attachment means included in an existing propeller hub, which is not part of the present invention. Flange 58 is thus illustrated as an exemplary mounting means 40, not in any limiting sense. Flange 58 is depicted as projecting from outer surface 56 of unitary ferrule 50, but an alternative flange (not shown) may be created by machining indentations in outer surface 56. Many other mounting means 40 are envisioned. Mounting means 40 could alternatively be included in inner bore 53, although with some loss of the productivity advantage of the preferred embodiment illustrated.

Flange 58 can be a separate component attached to unitary ferrule 50, such as to outer surface 56, by adhesive or by mechanical fasteners. A separate flange 58 would probably result in decreased strength of the propeller assembly, however. Other types of attachment means 40 attached to unitary ferrule 50 or to root portion 27 are envisioned, but not illustrated.

FIGS. 3 through 5 illustrate the particular internal pressure molding process used to make blade assembly 10. FIG. 3 is an exploded perspective view of components of a preferred mold assembly 80 used to manufacture the propeller blade assembly 10 of FIG. 1. FIG. 4 is a reduced perspective view, partly cut away, of mold assembly 80 of FIG. 3 assembled and closed in molding configuration. FIG. 5 is an enlarged cross-section view of mold assembly 80 of FIG. 4, taken along line 5—5. Mold 81 includes an internal cavity 85 for molding the outer surface of airfoil portion 21 of blade assembly 10 and which includes a recess 86 for receiving unitary ferrule 50.

FIG. 3 depicts mold 81, consisting of two segments 81A and 81B. As mentioned in the Background section above, a two-part mold 81 is especially useful for molding articles having generally bilateral symmetry, such as a typical propeller blade. Two-part mold 81, designed as shown in FIG. 3, also has the advantage of producing a seam only around the periphery of blade 20. This is preferable to producing seams in one or both sides 23 of blade 21. In the case of propeller blade assembly 10, the peripheral seam is preferably reinforced by addition of a metal channel (not shown), such as of electroformed nickel, along leading edge 24 to protect leading edge 24 from abrasion and damage from gravel, sand, and raindrops.

Mold halves 81A, 81B include cavity segments 85A, 85B that support uncured resin/fiber composite material and define the final outer shape of blade 20. Uncured resin/fiber composite material is laid into each of cavities 85A,85B according to the lay-up schedule for the blade assembly 10 being made. Cavities 85A,85B are typically treated with a "release agent" to prevent the resin matrix of fiber-reinforced resin 31 from adhering to cavities 85A,85B, as is well-known. Mold halves 81A,81B containing uncured resin/fiber composite material arranged according to a lay-up schedule is herein called a "laid-up assembly." Each cavity segment 85A,85B includes a machined recess segment 86A,86B for holding a segment of unitary ferrule 50. As mentioned above, cavity segment 85A,85B can alternatively include a large, 'universal' recess segment (not shown) that is adapted to fit a specific unitary ferrule 50 by means of a ferrule insert (not shown). Note that when mold half 81B is placed on top of mold half 81A, recess segments 86A,86B cooperate to form ferrule recess 86, which is open at one end.

Bladder 90 is a balloon that can be inflated to pressurize fiber-reinforced resin 31 from within. It is shaped so as to exert generally uniform pressure on the inside of cavity 85 when bladder 90 is inflated. Bladder 90 is made of a material that does not adhere well to the cured resin matrix of fiber-reinforced resin 31, as is well-known in the art.

Neck 94 of bladder 90 is stretched over bladder cone 95. After neck 94 is secured to bladder cone 95, un-inflated bladder 90 is placed on the uncured composite material laid up in one mold half, 81B.

The mold half 81B and bladder 90 are inverted onto the other mold half 81A. After the two mold halves are closed together, unitary ferrule 50 is passed over bladder cone 95 and attached neck 94. Unitary ferrule 50 is inserted into recess 86, blade end 51 first, such that the uncured composite material that is to form root portion 27 passes inside inner bore 53.

Closed mold halves 81A,81B; the laid-up assembly; bladder 90, bladder cone 95; and inserted unitary ferrule 50 are herein collectively called the mold assembly 80.

After unitary ferrule 50 is in place in ferrule recess 86, an air hose 102 is attached to bladder cone 95 by means well known in the art, such as by air fitting 104, and to a pressurized gas source, such as compressed air source 100, such as tank 101, as best seen in FIG. 4. Bladder cone 95 seals neck 94 by pressing neck 94 against the inner surface of pressure cap 98 and holds neck 94 in the center of inner bore 53 so that uniform pressure is exerted on all surfaces of inner bore 53 by inflated neck 94.

In the preferred embodiment of FIGS. 3, 4, and 5, pressure cap 98 and bolts 99 are also included in mold assembly 80. Pressure cap 98 is attached to mold 81, such as by bolts 99. Compressed air is used to inflate bladder 90, such as to a pre-set line pressure, or to a desired mold pressure by observing a mold pressure gauge (not shown). Pressure cap 98 covers hub face 52 of unitary ferrule 50, allowing cavity 85 to be pressurized.

Mold assembly 80 is heated, such as by placing mold assembly 80 in an oven (not shown), or by activating electrical resistance heaters (not shown) included in mold 81. Many other means of heating mold assembly 80 are possible.

The uncured resin/fiber composite conforms precisely to mold cavity 85 and to inner bore 53, including grooves 55. The resin matrix of fiber-reinforced resin 31 flows slightly and wets the surface of inner bore 53. Continued heating causes active sites on the resin molecules to react with other active sites to form crosslinks among molecules. Mold assembly 80 is maintained at a known cure temperature long enough to allow nearly all potential crosslinks to form, which causes the resin matrix to harden into a solid mass around the embedded fibers.

After the curing operation, mold assembly 80 is allowed to cool. As mold assembly 80 cools, differential shrinkage results in unitary ferrule 50 compressing root portion 27 slightly, enhancing the strength of retaining means 54. Bolts 99 are removed to release pressure cap 98 from mold 81. Bladder 90 is de-inflated and readily releases from blade cavity 29. Bladder 90 is withdrawn from blade cavity 29 through inner bore 53. Mold halves 81A,81B are separated and cured blade assembly 10 is removed from mold 81. Mold 81 can be re-used an indefinite number of times.

Unlike compression molded blade assemblies described in other patents, little post-cure machining is required on blade assembly 10. Unitary ferrule 50 does not have cured resin on outer surface 56 that must be removed. Metal plugs or caps do not need to be glued to root portion 27 to allow attachment to the propeller hub, so root portion 27 needs no machining to fit them. The only machining typically done is to remove "flash", low-molecular-weight resin that escapes into the seam of most molds.

As seen from the preceding detailed description of the invention, blade assembly 10 is a very strong, light, and inexpensive blade assembly for use in making a propeller assembly for a high-performance airplane, or for other uses. Blade assembly 10 is self-reinforced and does not require expensive, heavy, precision-machined inserts inside blade 20. The method described is a surprisingly simple and productive process for manufacturing blade assembly 10.

Although a particular embodiment of the invention has been illustrated and described, various changes may be made in the form, composition, construction, and arrangement of the parts herein without sacrificing any of its advantages. Therefore it is to be understood that all matter herein is to be interpreted as illustrative and not in any limiting sense, and it is intended to cover in the appended claims such modifications as come within the true spirit and scope of the invention.

I claim:

1. A propeller blade assembly for mounting onto a propeller hub, including:
   mounting means for mounting said assembly onto the hub; including:
      a unitary ferrule including:
         an inner bore; and
      a fiber-reinforced resin composite blade for moving a fluid including:
         an airfoil portion; and
         a root portion attached to said inner bore of said unitary ferrule; said composite blade comprising a gas-filled shell.

2. The blade assembly of claim 1, said inner bore including mechanical retaining means for retaining said root portion within said inner bore.

3. The blade assembly of claim 2, said retaining means comprising a plurality of grooves in a direction normal to the long axis of said airfoil portion.

4. The propeller blade assembly of claim 1, said airfoil portion including:
   a tip opposite said root portion;
   a long axis between said tip and said root portion;
   a leading edge;
   a trailing edge; and
   two sides joined together at said tip and along said leading, and said trailing edges.

5. The propeller blade assembly of claim 1, said mounting means including:
   a flange connected to said unitary ferrule and adapted to be mounted on a propeller hub.

6. The propeller blade assembly of claim 1, said unitary ferrule including:
   an outer surface; including:
      a flange adapted to be mounted on a propeller hub.

7. The propeller blade assembly of claim 1, said inner bore including:
   a plurality of circumferential grooves for helping retain said root portion within said inner bore.

8. A propeller blade assembly for mounting onto a propeller hub, including:
   mounting means for mounting said assembly onto the hub; including:
      a unitary ferrule including:
         an inner bore, and
      a fiber-reinforced resin composite blade for moving a fluid attached to said inner bore of said unitary ferrule; including:
         an airfoil portion for moving air; said airfoil portion having a longitudinal axis; and
         a root portion attached to said unitary ferrule; said composite blade comprising a gas-filled shell; and said composite blade being manufactured from resin-impregnated fabric by the process of internal pressure molding using a mold and an inflatable bladder attached to a source of pressurized gas, and including a heat-curing operation; said root portion and said inner bore having been maintained in direct contact during the curing operation.

9. The propeller blade assembly of claim 8, wherein said unitary ferrule was part of the mold for molding said composite blade.

10. The propeller blade assembly of claim 9, said inner bore of said unitary ferrule including mechanical retaining means for retaining said root portion within said inner bore.

11. The propeller blade assembly of claim 10, said retaining means comprising a plurality of grooves in a direction normal to the longitudinal axis of said airfoil portion.

12. The propeller blade assembly of claim 8, said mounting means including:
   a flange connected to said ferrule and adapted to be mounted on a propeller hub.

13. The propeller blade assembly of claim 8, said unitary ferrule including an outer surface; including:
   a flange adapted to be mounted on a propeller hub.

14. The propeller blade assembly of claim 8, said inner bore including:
   a plurality of circumferential grooves for helping retain said root portion within said inner bore.

15. The propeller blade assembly of claim 8, said unitary ferrule including:
   a flange adapted to be mounted on a propeller hub.

\* \* \* \* \*